Nov. 6, 1973   R. V. NORTON   3,770,818
PREPARATION OF MONOAMMONIUM ISOPHTALATE
Filed Aug. 18, 1972
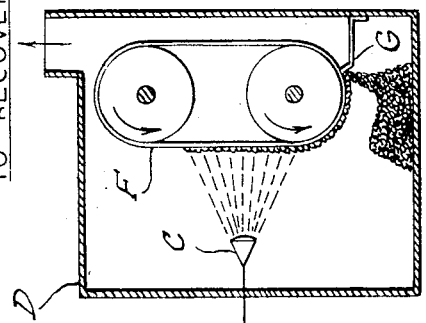
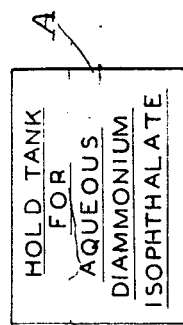
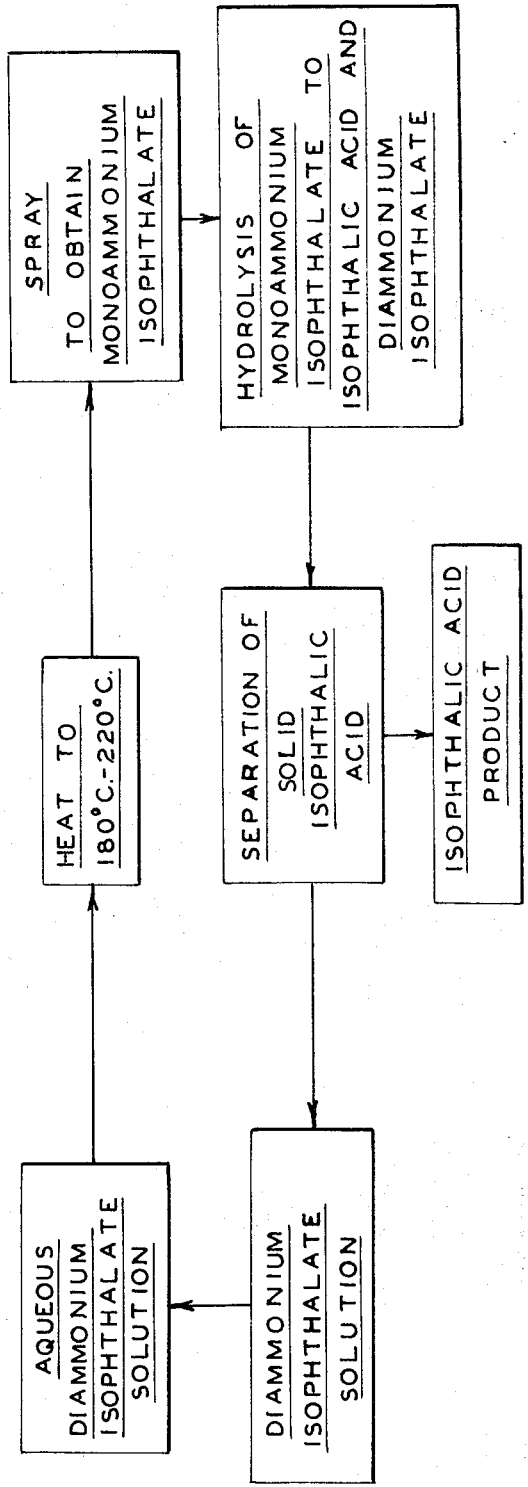

United States Patent Office 3,770,818
Patented Nov. 6, 1973

3,770,818
PREPARATION OF MONOAMMONIUM
ISOPHTHALATE
Richard V. Norton, Wilmington, Del., assignor to Sun
Research and Development Co., Philadelphia, Pa.
Filed Aug. 18, 1972, Ser. No. 281,668
Int. Cl. C07c 63/24
U.S. Cl. 260—515 P                                    4 Claims

ABSTRACT OF THE DISCLOSURE

A process for making monoammonium isophthalate of high purity which comprises heating a solution of diammonium isophthalate to a temperature between about 180° C. to about 220° C., spraying said heated solution into a chamber at atmospheric or sub-atmospheric pressure, whereby liquid is evaporated and pyrolysis of said diammonium salt to the monoammonium salt occurs, and separating solid monoammonium isophthalate from said chamber.

---

Isophthalic acid is a well known intermediate to polyester resins. In many applications for isophthalic acid it is desirable that it be of high purity and free of nitrogen containing impurities. Thus, where isophthalic acid is derived from its monoammonium salt by pyrolysis to the acid, the starting monoammonium salt should be of high purity to avoid contamination of the acid product.

It is known from the disclosure of U.S. 3,031,500 that by heating dry diammonium terephthalate or a suspension of the salt in an inert solvent or partial solvent (such as water), the heating step being at a temperature above 120° C., the resultant product is the corresponding acid. Also of interest in this area is the paper by Satoh and Sogabe on "The Specific Heats of Some Solid Aromatic Acids and Their Ammonium Salts and the Atomic Heat of Nitrogen" published Dec. 1, 1939 as paper number 940 (vol. 36) of the "Scientific Papers of the Institute of Physical and Chemical Research" (Japan). This paper discloses that when neutral ammonium m-phthalate (i.e., diammonium isophthalate) was dissolved in water and evaporated several times, a mixture was obtained consisting of 45.24% m-phthalic acid (i.e., isophthalic acid) and 54.67% acid ammonium m-phthalate (i.e., the monoammonium salt of isophthalic acid). Similarly, M. Hajek et al. in Collection Czechoslov. Chem. Commun. vol. 36 (1971) pages 84–91 discussed their paper "Kinetics of Thermal Decomposition of Ammonium Salts of Terephthalic and Isophthalic Acids" and conclude that where crystalline diammonium terephthalate or diammonium isophthalate are pyrolyzed to the acid when heated on a fluidized bed by a stream of inert gas at 100–200° C. both ammonia molecules of the salt were split off simultaneously. Thus, the art teaches that heating the diammonium salts of isophthalic and terephthalic acids leads to the dibasic acids.

It has now been found that monoammonium isophthalate may be made in high purity without the dibasic acid being formed by heating an aqueous solution of diammonium isophthalate to a temperature between about 180° C. and about 220° C., spraying said heated solution into a chamber at atmospheric or sub-atmospheric pressure, whereby liquid is evaporated and pyrolysis of said diammonium salt to solid monoammonium salt occurs, and separating solid monoammonium isophthalate from said chamber. Another embodiment of this invention is a further step combined with the above where the monoammonium isophthalic acid is converted to a mixture of isophthalic acid and diammonium isophthalate by heating an aqueous solution or slurry of the mono-salt at about 125° C. to about 175° C. and the diammonium isophthalate which is separated from the isophthalic acid product is recycled.

In order to further describe the process, reference is made to FIG. 1 which illustrates how the process may be carried out. A hold tank A for an aqueous diammonium isophthalate solution of from about 0.2 to about 2.5 molal and which may be held under a blanket of nitrogen or other inert gas, feeds into a heater B where the temperature of the solution is raised to between about 180° C. and about 220° C. and the solution then passes through a nozzle C which sprays the solution into a chamber D which is vented to an ammonia recovery system E. Since the pressure of the chamber D is maintained at atmospheric or sub-atmospheric pressure the spray within the chamber D is vaporized, and the diammonium salt is converted to the monoammonium salt. The particular spray nozzle used in the process is not a critical parameter, but the spray will be adjusted as fine as possible. Any common atomizing nozzle is suitable and preferably will be made of titanium to avoid corrosion. Likewise, all parts of the process exposed to the aqueous solution of diammonium salt will be made of titanium, glass or other corrosion resistant material. The temperature within chamber D need not be controlled, the temperature being ambient, reflecting the input temperature of the diammonium salt solution. As indicated, the chamber D will be at atmospheric or sub-atmospheric pressure, the ammonia and water vapor (steam) being drawn off by suction or other appropriate equipment (not shown) in order to recover the ammonia and use the steam for heat exchange purposes. The monoammonium isophthalate product may be left to fall to the bottom of the chamber D for recovery or, as shown in the drawing, the spray may be made to impinge on a moving belt F and the dry or damp monoammonium salt product removed therefrom by a doctor blade G. It will be understood that other techniques for accumulation and removal of the solid product (e.g., a moving disc) may also be employed.

As indicated above, the temperature of the aqueous diammonium isophthalate solution is brought to between about 180° C. and about 220° C. However, it is desirable that residence time of this solution in the heater be a minimum and it will be understood that this time will be dependent upon the type and construction of the heater which will determine its efficiency. In general, however, a heating unit should be used which will keep residence time less than 10 minutes, preferably less than 5 (say about 2 to 3 minutes), although longer times are not detrimental at the above temperature range. Should the temperature exceed 230° C., however, a long residence time (e.g., about 1 hour) will result in decomposition of the salt with the formation of unwanted amide impurities.

After recovery of the monoammonium isophthalate product this is readily converted to the free acid by simply dispersing it in water and heating the dispersion at a temperature of from about 125° C. to about 175° C. This causes disproportionation of the mono-salt to yield a mixture of isophthalic acid and diammonium isophthalate in aqueous solution. The free acid is then simply filtered off and the diammonium salt solution, after being decolorized with activated charcoal, is recycled for further conversion to mono-salt in accord with the above described process. Since the mono-salt is of high purity, its disproportionation in the aqueous system as described above, results in isophthalic acid of extremely high purity.

In order to further illustrate the invention, the following examples are given:

EXPERIMENTAL DETAILS

A hold tank containing an aqueous solution of diammonium isophthalate at 50° C. and at various molal concentrations is pressured with nitrogen to 1200 p.s.i.g. and the solution is passed through a 0.25 inch stainless steel tube surrounded by electrical heating elements which raises the temperature of the solution to the desired experimental value. After exiting from the heater the solution is passed through an atomizing spray nozzle into a chamber open to the atmosphere and containing a moving belt made of fine mesh stainless steel cloth. The steam and ammonia vaporized escapes to the atmosphere and the sprayed material is collected on the belt and scraped to provide a damp cake of product. Nitrogen analysis provided the analytical data shown in the following table. Paper chromatographic analysis indicated that no amide impurities were formed.

| Diammonium isophthalate solution (moles/1,000 g. $H_2O$) | Heater temp. (° C.) | Residence time in heater (min.) | Nozzle spray temp., ° C. | Weight, percent N in product | Components in product (wt. percent) | | |
|---|---|---|---|---|---|---|---|
| | | | | | DiNH$_4$+ salt | Mono (NH$_4$+ salt) | Isophthalic acid |
| 0.5 | 150 | 10 | 145–150 | 12.28 | 72.6 | 27.4 | 0.0 |
| 0.5 | 200 | <5 | 190–200 | 7.81 | 2.5 | 97.5 | 0.0 |
| 0.5 | 250 | <5 | 243–250 | 2.13 | 0.0 | 27.8 | 72.2 |
| 0.5 | 300 | <5 | 291–300 | 1.71 | 0.0 | 22.4 | 77.6 |
| 1.0 | 150 | 10 | 148–150 | 12.62 | 78.3 | 21.7 | 0.0 |
| 1.0 | 200 | <5 | 192–200 | 7.92 | 4.3 | 95.7 | 0.0 |
| 1.0 | 250 | <5 | 235–250 | 2.54 | 0.0 | 33.2 | 66.8 |
| 1.0 | 300 | <5 | 287–300 | 2.35 | 0.0 | 30.7 | 69.3 |
| 1.5 | 150 | 10 | 146–150 | 13.78 | 96.5 | 3.5 | 0.0 |
| 1.5 | 200 | <5 | 193–200 | 8.41 | 12.0 | 88.0 | 0.0 |
| 1.5 | 250 | <5 | 245–250 | 3.01 | 0.0 | 39.3 | 60.7 |
| 1.5 | 300 | <5 | 290–300 | 2.71 | 0.0 | 35.4 | 64.6 |

It will be observed from the above data that only at spray temperatures of about 180° C. to about 220° C. are the high yields of the mono-salt obtained and that under the conditions of the process no isophthalic acid is formed.

The integrated process of the invention is illustrated by FIG. 2. As indicated there, an aqueous diammonium isophthalate solution of from about 0.2 to about 2.5 molal is heated to 180° C. to 220° C. and sprayed into a chamber as discussed above where the monoammonium isophthalate is obtained in high yield and good purity. The monoammonium salt is separated from the spray chamber, dispersed in water and the dispersion heated with agitation to a temperature of from about 125° C. to about 175° C. under which conditions hydrolysis occurs. The hydrolysis reaction results in a disproportionation in accord with the following reaction scheme:

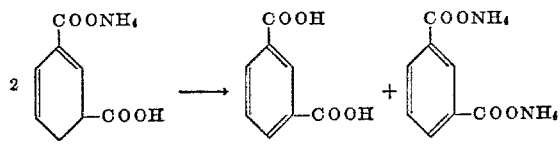

The isophthalic acid product has a much lower solubility in the aqueous system than does the diammonium salt, and accordingly, filtration enables the isophthalic acid product to be easily separated. Preferably, before filtration the hydrolysis reaction mass will be cooled to room temperature in order to assure a clean separation. The aqueous filtrate containing the diammonium isophthalate is recycled for further heating and conversion to the monosalt. In this way an extremely efficient low cost process for high purity isophthalic acid is achieved.

The invention claimed is:

1. A process for making essentially pure monoammonium isophthalate which comprises heating an aqueous solution of diammonium isophthalate to a temperature between about 180° C. and about 220° C., spraying said heated solution into a chamber at atmospheric or sub-atmospheric pressure whereby the liquid phase is evaporated and conversion to solid monoammonium isophthalate devoid of free isophthalic acid occurs.

2. A process as in claim 1 where the heated diammonium isophthalate solution is sprayed onto a moving surface and monoammonium isophthalate product separated therefrom.

3. A process for making essentially pure monoammonium isophthalate which comprises heating an aqueous solution of diammonium isophthalate of from about 0.2 to about 2.5 molar to a temperature of about 210° C. to 260° C., spraying said heated solution into a chamber at atmospheric or sub-atmospheric pressure whereby the liquid phase is evaporated and conversion to solid monoammonium isophthalate devoid of free isophthalic acid occurs.

4. A process as in claim 1 where the solid monoammonium isophthalate product is separated from said chamber, dispersed in water, said dispersion heated to a temperature of from about 125° C. to about 175° C. whereby said monoammonium isophthalate is converted to a mixture of isophthalic acid and diammonium isophthalate, separating solid isophthalic acid and recycling said diammonium isophthalate for further conversion to monoammonium isophthalate.

References Cited

UNITED STATES PATENTS 3,031,500  4/1962  Gasson et al. _____ 260—515
2,979,526  4/1961  Gasson et al. _____ 260—515

OTHER REFERENCES

Arkhipova et al.: Chem. Abstracts, vol. 62 (1965), p. 5169.

Hajek et al.: Coll. Czech. Chem. Commun., vol. 36 (1971), pp. 84–91.

JAMES A. PATTEN, Primary Examiner